United States Patent [19]

Loew

[11] Patent Number: 4,629,072

[45] Date of Patent: Dec. 16, 1986

[54] APPARATUS FOR STORING AND DISPENSING STACKED ARTICLES

[75] Inventor: Jonathon A. Loew, Glenhead, N.Y.

[73] Assignee: P.O.P. Displays, Inc., Long Island City, N.Y.

[21] Appl. No.: 682,086

[22] Filed: Dec. 17, 1984

[51] Int. Cl.$^4$ ............................................. A47F 7/28
[52] U.S. Cl. .................................... 211/59.3; 108/136
[58] Field of Search ...................... 211/59.3; 108/136; 312/306, 71

[56] References Cited

U.S. PATENT DOCUMENTS

| | | | |
|---|---|---|---|
| 1,185,793 | 6/1916 | Hanson | 211/59.3 X |
| 3,154,029 | 10/1964 | Bronson | 211/59.3 X |
| 3,283,731 | 11/1966 | Maslow | 108/136 |
| 3,302,827 | 2/1967 | Maslow | 211/59.3 X |
| 3,339,795 | 9/1967 | Cappel | 312/306 X |
| 3,565,500 | 2/1971 | Shelley | 312/71 |

Primary Examiner—Robert W. Gibson, Jr.

Attorney, Agent, or Firm—Steinberg & Raskin

[57] ABSTRACT

Apparatus for storing and dispensing stacked articles, such as cases of wine stacked one upon the other, includes a frame in which a platform is situated on which the stack of articles is supported. The platform is coupled to a mechanism which is positioned under the weight of the stack so that the uppermost article is presented at a predetermined height for automatically elevating the platform and stack supported thereby upon removal of the uppermost article whereby the next article beneath it automatically comes into position at that predetermined height. The mechanism comprises a torsion spring one end of which is attached to the platform and the other end of which is connected to a drum which is mounted to the underside of the support platform. Each lateral end of the drum has a pulley region around which a pair of cables are wound, each cable having a free end which is attached to an upper end of the frame of the apparatus and supports along its length a respective corner of the support platform.

16 Claims, 8 Drawing Figures

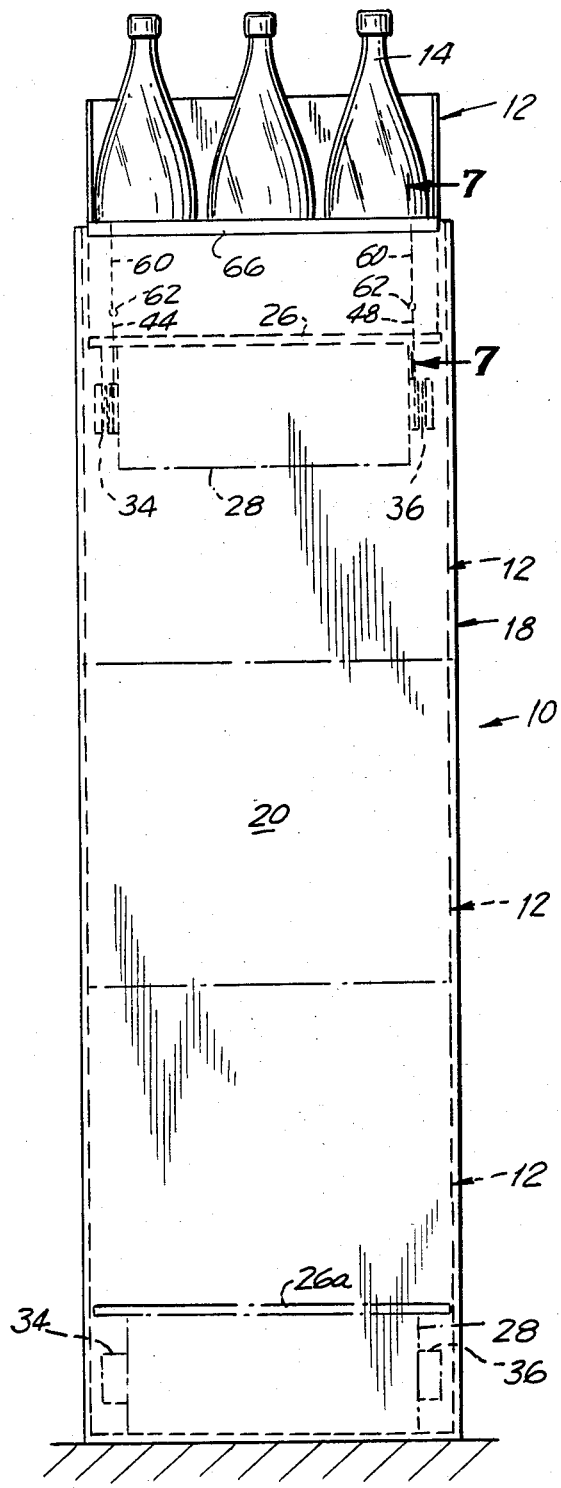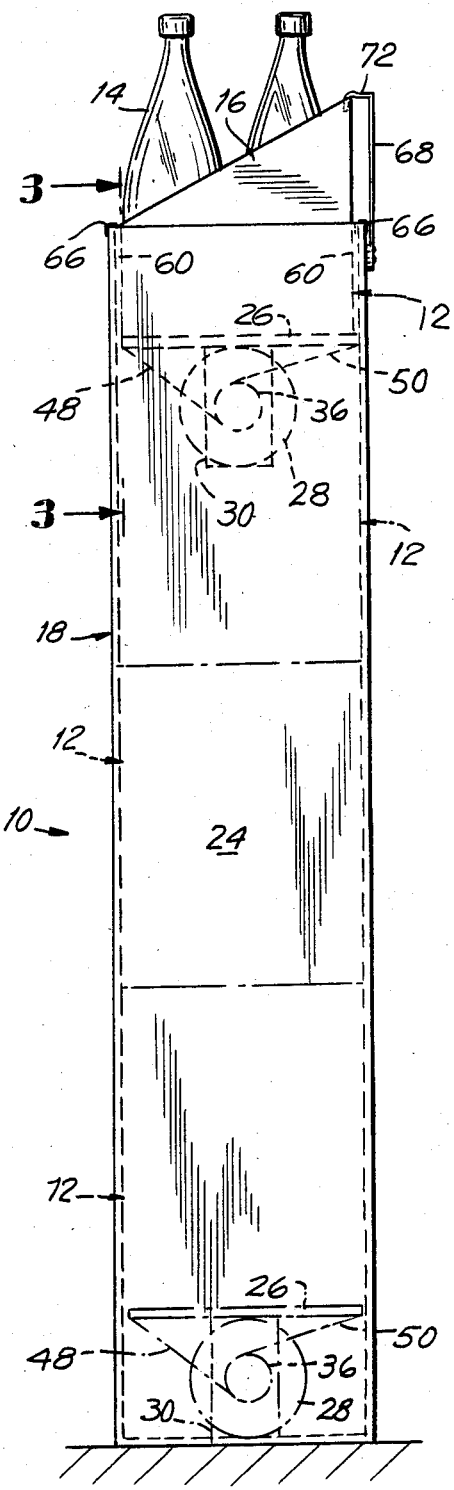

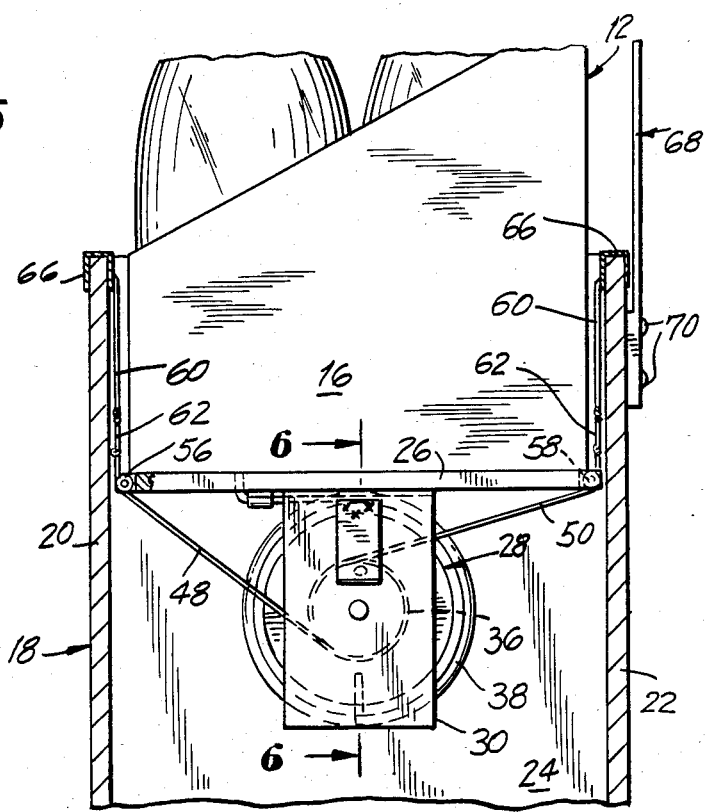
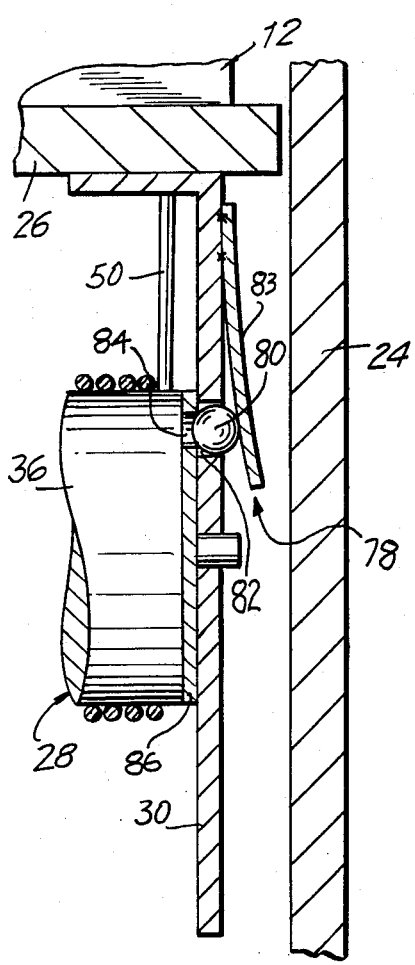
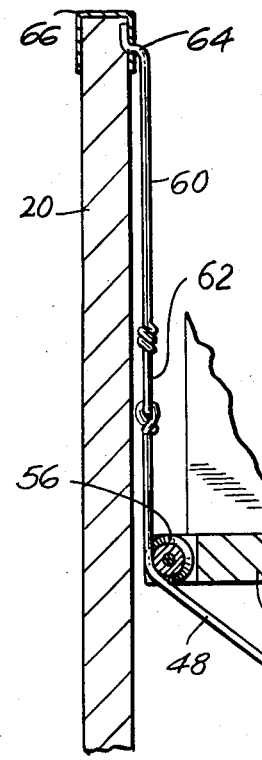
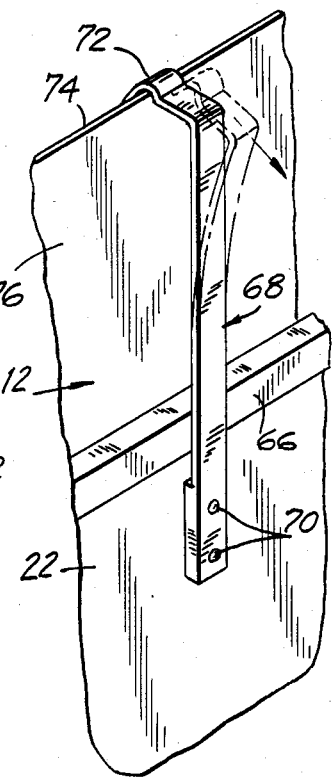

APPARATUS FOR STORING AND DISPENSING STACKED ARTICLES

BACKGROUND OF THE INVENTION

This invention relates generally to apparatus for storing and dispensing and/or displaying the uppermost one of a plurality of stacked articles. More particularly, the present invention relates to apparatus for storing and dispensing stacked articles wherein upon removal of the uppermost articles of the stack, the stack is indexed upwardly to dispense or display the new uppermost article.

Apparatus are known for storing and dispensing stacked articles in such position that the uppermost article of the stack is presented for display or dispensing at a predetermined convenient height while those articles below it are held in position ready to be fed automatically upwardly upon removal of the uppermost article. whereby the next article beneath it comes automatically into position at that predetermined height.

Conventional apparatus of this type are not entirely satisfactory in all applications. Conventional apparatus for storing and dispensing stacked articles are generally constructed with mechanisms for elevating a platform or pallet on which the stack of articles is supported. Such mechanisms are rather complicated in construction, variously requiring sprocket chain arrangements, counterbalancing weight arrangements, complicated compression spring configurations and the like. The elevating or lifting mechanisms generally are housed in casings or frames which require that the apparatus including the elevator platform, lifting mechanism and frame be manufactured and supplied as an integrated unit. In applications where the supporting platform or pallet supports a plurality of stacked articles, wherein each article itself includes a plurality of laterally adjacent units, for example where each article comprises a case of laterally adjacent bottles, uneven removal of one or more of the units from the uppermost article may result in tilting or cocking of the platform.

SUMMARY OF THE INVENTION

Accordingly, it is an object of the present invention to provide new and improved apparatus for storing and dispensing stacked articles.

Another object of the present invention is to provide new and improved apparatus for storing and dispensing articles wherein a platform or pallet on which the stack of articles is supported is lifted by means of a mechanism having a relatively simple construction.

Still another object of the present invention is to provide new and improved apparatus for storing and dispensing stacked articles wherein the elevator platform and lifting mechanism are constituted as an integrated device which may be supplied separately from a frame or casing, if desired.

A further object of the present invention is to provide new and improved apparatus for storing and dispensing stacked articles wherein when used in applications where the supporting platform supports a plurality of stacked articles and each article itself includes a plurality of units, the supporting platform remains level even in the event of uneven removal of one or more units from the uppermost article.

Briefly, in accordance with the present invention, these and other objects are attained by providing apparatus for storing and dispensing and/or displaying the articles wherein the stack of articles is supported on a platform coupled to a mechanism which is positioned under the weight of the stack so that the uppermost article is presented for display or dispensing at a predetermined height. A mechanism is provided for automatically elevating the platform and stack supported thereby upon removal of the uppermost article whereby the next article beneath it comes automatically into position at that predetermined height. According to the invention, the mechanism comprises a torsion spring having one end attached to the platform and its other end connected to a drum which is rotatably mounted to the underside of the platform. Each lateral end of the drum has a pulley region or pulley around which a pair of flexible cables are wound in the same direction. Each cable has a free end which is attached to an upper end of the frame or housing of the apparatus and supports along its length a respective corner of the support platform. Stacking of articles onto the platform causes the torsion spring to wind on the drum as the platform descends under the weight of the stack. Removal of the uppermost articles causes the torsion spring to unwind, which in turn causes the drum to rotate and thereby reel in the four cables. The reeling in action causes the platform to travel up the cables to a new elevation that compensates for the lost weight of the removed article.

Supporting the platform by the combined independent effects of the four cables connected to the drum prevents the platform from tilting or cocking in the event of uneven removal of separate units from an uppermost article. The system is in continuous force balance so that the work energy required to lift the stack of articles until the uppermost one is situated at a predetermined convenient height is stored in the torsion spring by the weight of the articles themselves. The platform and associated mechanism, i.e., the torsion spring wound around the rotatable drum and cables wound around the pulley regions of the drum, form an integrated unit which may be supplied independently of the the frame or housing in which the stacked articles are stored.

DETAILED DESCRIPTION OF THE DRAWINGS

A more complete appreciation of the present invention and many of the attendant advantages thereof will be readily understood by reference to the following detailed description when considered in connection with the accompanying drawings in which:

FIG. 1 is a front elevation view of an embodiment of apparatus for storing and dispensing stacked articles in accordance with the present invention in the form of apparatus for storing and dispensing cases of wine;

FIG. 2 is a side elevation view of the apparatus illustrated in FIG. 1;

FIG. 5 is a section view taken along line 5—5 of FIG. 3;

FIG. 6 is a section view taken along line 6—6 of FIG. 5;

FIG. 7 is a section view taken along line 7—7 of FIG. 1; and

FIG. 8 is a partial perspective view of a device for limiting the height of the uppermost case upon removal of individual wine bottles from the uppermost wine case.

DESCRIPTION OF THE PREFERRED EMBODIMENT

Figure 3:
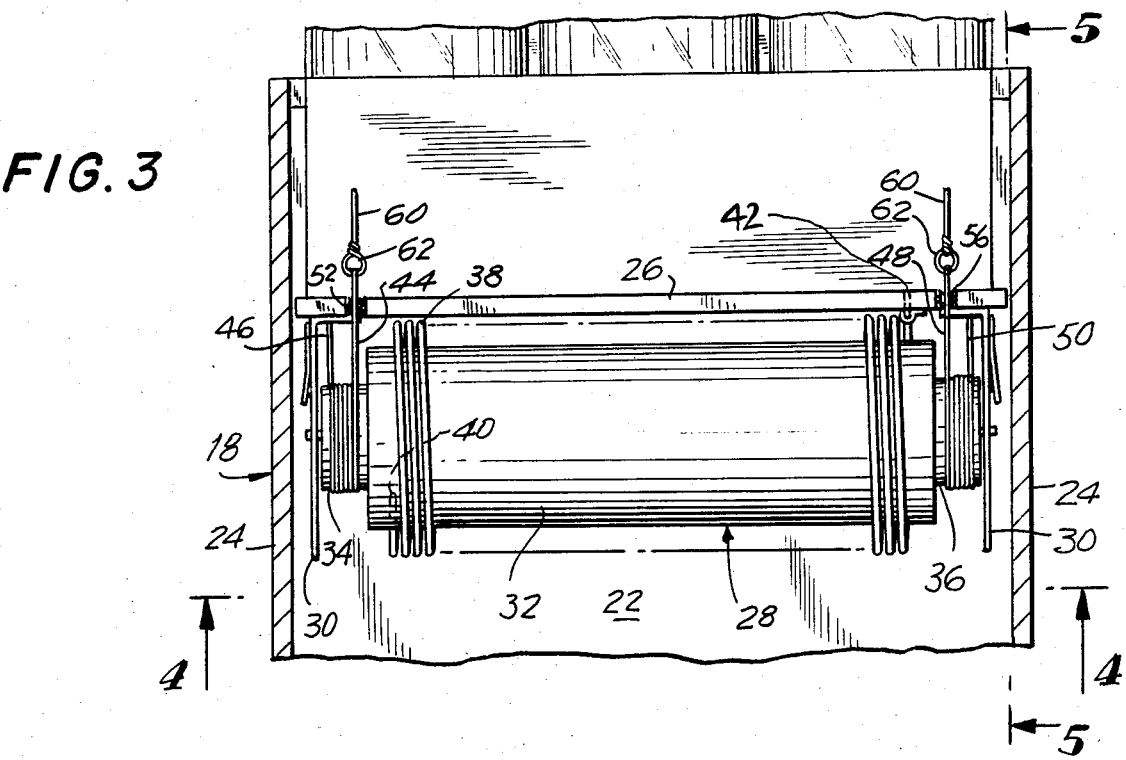
FIG. 3 is a section view taken along line 3—3 of FIG. 2.

Referring now to the drawings wherein like reference characters designate identical or corresponding parts throughout the several views, and more particularly to FIGS. 1-5, apparatus, generally designated 10, for storing and dispensing stacked cases 12 of wine bottles 14 incorporating the present invention are illustrated. Although the invention is illustrated in connection with the storage and dispensing or display of cases of wine bottles, it is understood that the invention is applicable to the storage and dispensing and/or display of stacks of other articles, such for example as trays containing various types of units, plates or dishes, etc.

Each wine case 12 includes bottom and four sides and contains a plurality, e.g. six of wine bottles 14. Two lateral opposed sides 16 of each case 12 increase in height in rearward direction as seen in FIGS. 2 and 5. The bottom of each case 12 is supported on the top of the wine bottles 14 of the immediately underlying case. The outer envelope of each case 12 (except for the case situated in the uppermost position) is shown in phantom in FIGS. 1 and 2 so that the apparatus 10 is capable of storing four cases 12 when fully loaded.

Apparatus 10 includes a storage frame 18 having front and rear walls 20 and 22 and opposed lateral walls 24 which together define an opening shaped to snugly receive the wine cases 12. A platform or pallet 26, supports the plurality of stacked wine cases 12, i.e., the bottom of the lowermost wine case 12 is supported on the upper surface of platform 26.

Figure 4:
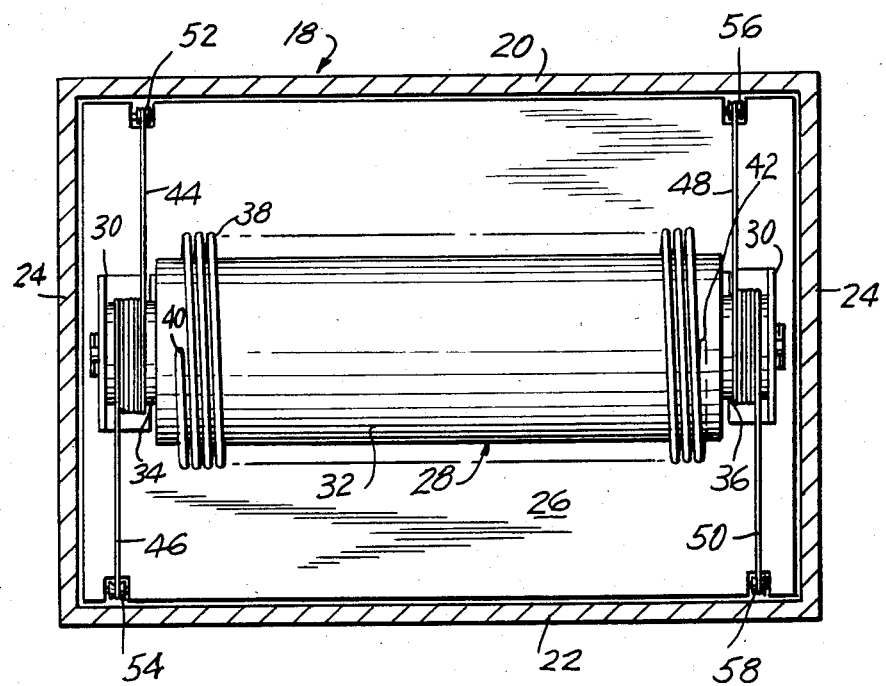
FIG. 4 is a section view taken along line 4—4 of FIG. 3.

A mechanism is provided for positioning the uppermost case 12 at a predetermined convenient height (shown by the case 12 in solid lines in FIGS. 1 and 2) and for automatically elevating the platform and the stack of wine cases supported thereby upon removal of the uppermost case whereby the next wine case beneath it automatically moves into position at that predetermined height. Referring to FIGS. 3-5, according to the invention, the mechanism includes a drum 28 rotatably mounted on the underside of platform 26 by means of a pair of brackets 30 fixed to the lower surface of platform 26. Drum 28 includes a large diameter major drum portion 32 and a pair of smaller diameter pulley regions 34 and 36, situated at respective lateral ends of drum portion 32. A helical torsion spring 38 is situated over the substantial length of major portion 32 of drum 28. One end 40 (FIGS. 3 and 4) of torsion spring 38 is affixed to drum 28 while the other torsion spring end 42 is fixed to the bottom surface of platform 26. A first pair of cables 44 and 46 each have one end fixed to the surface of pulley region 34 and are wound around it in the same direction. Similarly, a second pair of cables 48 and 50 each have one end affixed to the surface of pulley region 36 and are wound around it in the same direction. Each pair of cables 44, 46, and 48, 50, may be connected to each other at their ends to which they are fixed to the respective pulley regions. As best seen in FIG. 4, a pulley is mounted at each corner of platform 26, rotatable about an axis parallel to the forward and rearward platform edges, over which one of the cables passes. In particular, cables 44, 46, 48 and 50 are passed over the outer surfaces of pulleys 52, 54, 56 and 58 from the underside of platform 26 so that their free ends are situated over its upper surface.

The free end of each cable is connected to the end of respective hanger member 60 best seen in FIG. 7. Each hanger member 60 has an eye 62 formed at the end to which the cable end is attached and a right-angle shoulder 64 formed at its other end. Each hanger member is fixed at a respective upper corner region of one of the front and rear walls 20 and 22 of frame 18 by a channel-shaped bracket 66 which is fitted over the upper edge of the wall through slots in which the hanger member shoulder 64 is captured as best seen in FIGS. 5 and 7.

In use, the platform 26 supports a stack of four wine cases 12 and is situated at the bottom end of frame 18. The platform is supported along the length of each of the cables as they pass over the surface of the corner pulleys mounted on platform 26.

During loading of the apparatus, a first wine case 12 is situated on platform 26 and subsequent cases 12 stacked thereover. Stacking of the containers 12 onto the platform 26 causes torsion spring 38 to wind on the drum as the platform descends under the weight of the stack. The torsion spring 38 has maximum torsional energy stored in it and the cables 44-50 are payed out from pulley regions 34 and 36 to their maximum extent when the uppermost wine case 12 has been added to the stack. This situation is illustrated by the position of the platform designated 26a in FIGS. 1 and 2. The apparatus is dimensioned so that the uppermost wine case is situated at a predetermined level (shown in solid lines in FIGS. 1 and 2) which is convenient for display and/or dispensing. Removal of the uppermost wine case 12 causes the torsion spring 38 to unwind which in turn causes the drum 28 to rotate and thereby reel in the four cables 44-50. The reeling in of the cables causes the platform to travel up the cables to a new elevation that compensates for the lost weight of the removed wine case.

Support of platform 26 by the combined independent effects of cables 44-50 connected to pulley regions 34 and 36 prevents the platform 26 from tilting in the event one or more bottles 14 are unevenly removed separately from the uppermost case 12. The spring 38 is designed with torsional characteristics to provide continuous force balance so that the energy required to lift the stack of wine cases until the uppermost one is situated at the desired height is stored in the spring 38 by the weight of the wine cases themselves. Since the platform 26 and lifting mechanism constituted by drum 28, brackets 30, torsion spring 38 and cables 44-50 form an integrated unit, it may be supplied independently of the frame 18. For example, if different articles are to be stacked in the apparatus, it is only necessary to substitute a new platform and mechanism (using a torsion spring having different characteristics depending upon the weight of the new articles) while still being able to retain the use of the same frame 18.

Referring to FIGS. 2, 5 and 8, a stop member 68 is affixed to the rear wall 22 of frame 18 to prevent the partially empty cases 12 from elevating beyond the predetermined desired height. Stop member 68 is an elongate member having a lower region fixed to rear frame wall 22 by fasteners 70 and an upper region terminating at a hooked portion 72 which is adapted to overlie and engage the upper edge 74 of the rear side 76 of a wine case 12. Upon the uppermost wine case being removed from the stack, the platform 26 elevates and a new uppermost case ascends to the predetermined height where upper edge 74 engages hooked portion 72. If one or more bottles 14 are removed from the uppermost container, the platform tends to rise a certain amount to compensate for the loss of weight. Hooked portion 72 of stop member 68 prevents such incremental elevation. Removal of an empty bottle case is accomplished by disengaging and releasing the stop member 68 from the case as shown in phantom in FIG. 8 to allow the next case to elevate into the display and dispensing position.

As an alternative, or in addition to stop member 68 which prevents the stack from incrementally elevating every time a bottle is removed from the uppermost case, a spring loaded detent 78 can be built into the ends of drum 28. The detent 78 functions as a differential torque sensing device that will prevent the stack from elevating until the last bottle has been removed from the uppermost case. As seen in FIG. 6, detent 78 includes a ball 80 held in opening 82 formed in bracket 30 by a leaf spring 83 so as to partially project into an opening 84 formed in an end plate 86 of drum 28. This effectively prevents rotation of drum 28 until a certain minimum torque is achieved in torsion spring 38. The detent 78 is designed so that with removal of the weight of the last bottle from the uppermost case, the built-up torque in the torsion spring 38 overcomes the retarding torque of detent 78 and causes the stack to be raised to the dispensing position.

The characteristics of the torsion spring 38 are readily calculatable from the weight and height of the stacked articles, platform and lifting mechanism and the diameter of the drum and pulley region as will be understood by those skilled in the art. In one embodiment, where the total weight of the platform and spring is about 6.6 pounds and each loaded case weights about 29 pounds with a maximum stroke of the platform of about 54 inches, a torsion spring formed of 0.177 inches diameter music wire, having a diameter of about two inches with 42.7 coils was found appropriate.

Obviously, numerous modifications and variations of the present invention are possible in the light of the above teachings. For example, metallic straps can be used in lieu of cables 44–50. Hooks can be fixed to the free ends of each cable or strap for direct connection to the upper edge of frame 18 in lieu of the hanger members 60. Separate pulleys may be fixed to drum 28 in lieu of the integrated pulley regions. It is therefore to be understood that within the scope of the claims appended hereto, the invention may be practiced otherwise than as specifically disclosed herein.

What is claimed is:

1. Apparatus for storing and dispensing stacked articles, comprising:
   a frame adapted to accommodate a plurality of stacked articles;
   a platform situated in said frame adapted to support the stack of articles, said platform having upper and lower surfaces and four corner regions; and
   means coupled to said platform for positioning the platform such that the uppermost article in the stack is positioned at a predetermined height and automatically elevating said platform and stack supported thereby upon removal of the uppermost article until the next article beneath it reaches said predetermined height, said positioning and elevating means including a drum rotatably mounted on said platform, a torsion spring situated over said drum, said torsion spring having a first end affixed to said platform and a second end fixed to said rotatable drum, first pulley means fixed to a first end of said drum, second pulley means fixed to a second end of said drum, a first pair of cable means, each having a first end affixed to said first pulley means, a second end adapted to be affixed to a respective upper region of said frame and a length portion engaging a respective corner region of said platform, and a second pair of cable means each having a first end affixed to said second pulley means, a second end adapted to be fixed to a respective upper region of said frame and a length portion engaging a respective corner region of said platform.

2. The combination of claim 1, wherein a rotatable pulley is mounted at each of said corner regions of said platform and wherein said length portion of each of said cable means passes over a respective one of said pulleys.

3. The combination of claim 1, wherein each of said first pair of cable means is wound around said first pulley means in the same direction and wherein each of said second pair of cable means is wrapped around said second pulley means in the same direction.

4. The combination of claim 1 wherein each of said first and second pulley means comprises a pulley region of said drum at a respective lateral end thereof, each pulley region having a diameter which is less than the diameter of said drum.

5. The combination of claim 1 further including means for fixing said second ends of said cable means to a respective upper region of said frame.

6. The combination of claim 5 wherein said fixing means include a hanger member having a first end to which said second end of respective cable means is fixed and a second attachment end, and bracket means adapted to be fitted over an upper edge of said frame for capturing said second attachment end of said hanger member.

7. The combination of claim 1 wherein each article of said stack includes a plurality of separately removable units, wherein said apparatus further includes means for preventing elevation of said platform upon removal of less than all of said units from said article.

8. The combination of claim 7 wherein said elevation preventing means include removable stop means affixed to said frame adapted to enage the uppermost of one of said articles to prevent elevation thereof.

9. The combination of claim 2, wherein said cable means each run directly from said respective pulley means to said respective pulleys.

10. The combination of claim 2, wherein each of said pulleys are disposed in a respective recess formed in said platform.

11. The combination of claim 10, wherein each of said pulleys are disposed at a distance away from said frame.

12. The combination of claim 1, where each of said first and second pulleys means comprise a pulley region of said drum at a respective lateral end thereof.

13. Apparatus for storing and dispensing stacked articles, comprising:
   a frame adapted to accommodate a plurality of stacked articles;
   a platform situated in said frame adapted to support the stack of articles, said platform having upper and lower surfaces and four corner regions; and
   means coupled to said platform for positioning the platform such that the uppermost article in the stack is positioned at a predetermined height and automatically elevating said platform and stack supported thereby upon removal of the uppermost article until the next article beneath it reaches said predetermined height, said positioning and elevating means including a drum rotatably mounted on said platform, a torsion spring situated over said drum, said torsion spring having a first end affixed to said platform and a second end fixed to said rotatable drum, first pulley means fixed to a first end of said drum, second pulley means fixed to a second end of said drum, a first pair of cable means, each having a first end affixed to said first pulley means, a second end adapted to be affixed to a respective upper region of said frame and a length portion engaging a respective corner region of said platform, and a second pair of cable means each having a first end affixed to said second pulley means, a second end adapted to be fixed to a respective upper region of said frame and a length portion engaging a respective corner region of said platform;

wherein each article of said stack includes a plurality of separately removable units, and said apparatus further including means for preventing elevation of said platform upon removal of less than all of said units from said article;

wherein said elevation preventing means include detent means coupled to the drum for sensing torque differentials.

14. The combination of claim 13 wherein said detent means include a plate affixed to a lateral end of said drum having a first aperture formed therein, a bracket to which the drum is rotatably mounted situated contiguous to said plate, said bracket having a second aperture formed therein adapted to aline with said first aperture during rotation of said drum, and a locking member held in said second aperture and adapted to project into said first aperture upon alignment of said first and second apertures, and leaf spring means for urging said locking member into said second aperture.

15. The combination of claim 14, wherein said locking member is a ball.

16. Apparatus for storing and dispensing stacked articles, comprising:

a frame adapted to accommodate a plurality of stacked articles;

a platform situated in said frame adapted to support the stack of articles, said platform having upper and lower surfaces and four corner regions; and means coupled to said platform for positioning the platform such that the uppermost article in the stack is positioned at a predetermined height and automatically elevating said platform and stack supported thereby upon removal of the uppermost article until the next article beneath it reaches said predetermined height, said positioning and elevating means including a drum rotatably mounted on said platform, a torsion spring situated over said drum, said torsion spring having a first end affixed to said platform and a second end fixed to said rotatable drum, first pulley means fixed to a first end of said drum, second pulley means fixed to a second end of said drum, a first pair of cable means, each having a first end affixed to said first pulley means, a second end adapted to be affixed to a respective upper region of said frame and a length portion engaging a respective corner region of said platform, and a second pair of cable means each having a first end affixed to said second pulley means, a second end adapted to be fixed to a respective upper region of said frame and a length portion engaging a respective corner region of said platform;

wherein each article of said stack includes a plurality of separately removable units, and said apparatus further including means for preventing elevation of said platform upon removal of less than all of said units from said article;

wherein said elevation preventing means includes means for sensing torque differentials.

* * * * *